US011851026B2

(12) United States Patent
Fisher et al.

(10) Patent No.: US 11,851,026 B2
(45) Date of Patent: Dec. 26, 2023

(54) BATTERY ACCESS FLIP STEP

(71) Applicant: PACCAR Inc, Bellevue, WA (US)

(72) Inventors: Jordan Michael Fisher, Seattle, WA (US); Jon David Polzin, Kenmore, WA (US); Piotr Stegawski, Kirkland, WA (US); Nicholas Coe Outlaw, Auburn, WA (US)

(73) Assignee: PACCAR Inc, Bellevue, WA (US)

( * ) Notice: Subject to any disclaimer, the term of this patent is extended or adjusted under 35 U.S.C. 154(b) by 241 days.

(21) Appl. No.: 17/107,739

(22) Filed: Nov. 30, 2020

(65) Prior Publication Data

US 2022/0169180 A1    Jun. 2, 2022

(51) Int. Cl.
*B60R 3/02* (2006.01)
*B62D 33/06* (2006.01)

(52) U.S. Cl.
CPC .............. *B60R 3/02* (2013.01); *B62D 33/06* (2013.01)

(58) Field of Classification Search
CPC ................................. B60R 3/02; B60R 3/002
USPC ......................................................... 280/166
See application file for complete search history.

(56) References Cited

U.S. PATENT DOCUMENTS

| | | | |
|---|---|---|---|
| 3,501,190 A * | 3/1970 | Mccrea | B60R 3/02 224/489 |
| 3,903,981 A | 9/1975 | Peterson | |
| 4,074,786 A * | 2/1978 | Joubert | B60R 11/06 180/68.5 |
| 4,194,754 A * | 3/1980 | Hightower | B60R 3/02 280/166 |
| 4,480,710 A | 11/1984 | Hansen | |
| 4,779,692 A | 10/1988 | Hagarty et al. | |
| 4,836,568 A * | 6/1989 | Preslik | B60R 11/06 296/180.1 |
| 4,930,797 A * | 6/1990 | Parrill | B60R 3/02 280/166 |
| 5,538,265 A * | 7/1996 | Chen | B60R 3/02 280/166 |
| 6,170,842 B1 * | 1/2001 | Mueller | B60R 3/02 280/166 |
| 6,460,915 B1 * | 10/2002 | Bedi | B60J 5/0498 296/183.1 |
| 7,637,563 B2 * | 12/2009 | Plett | B62D 25/10 280/166 |
| 8,696,005 B2 * | 4/2014 | Kim | B60R 3/02 280/166 |
| 9,233,722 B1 * | 1/2016 | Bixby | B60R 3/00 |
| 9,387,805 B2 * | 7/2016 | Helmuth | B60R 16/04 |

(Continued)

*Primary Examiner* — Jason S Morrow
(74) *Attorney, Agent, or Firm* — SEED INTELLECTUAL PROPERTY LAW GROUP LLP

(57) ABSTRACT

An access panel at and on a cab step of a vehicle is provided for access to a compartment of the vehicle. In some instances, the access panel includes a tread portion and a riser portion such that the access panel has a substantially L-shape. A pair of hinge components are coupled to an internal surface of the access panel such that the access panel can be hingedly displaced between a closed position and an opened position. In the closed position, the access panel covers and protects the compartment within the vehicle, and in the opened position the access panel provides a user or mechanic access to the compartment. The compartment may contain wiring, batteries, gears, etc., that need to undergo routine maintenance, emergency fixes, or diagnostic tests.

17 Claims, 14 Drawing Sheets

(56) References Cited

U.S. PATENT DOCUMENTS

| | | |
|---|---|---|
| 9,796,337 B2 | 10/2017 | Helmuth et al. |
| 10,099,622 B2 * | 10/2018 | Handschke ............... B60R 3/02 |
| 10,161,107 B2 * | 12/2018 | Namai .................. E02F 9/0833 |
| 11,254,265 B2 * | 2/2022 | Miller ....................... B60R 3/02 |
| 2002/0003340 A1 * | 1/2002 | Hallquist .................. B60R 3/02 |
| | | 280/163 |
| 2008/0129079 A1 * | 6/2008 | Plett ....................... B62D 25/24 |
| | | 296/146.5 |
| 2010/0066052 A1 * | 3/2010 | Plett .................... B62D 35/001 |
| | | 296/193.03 |
| 2011/0121612 A1 * | 5/2011 | Plett .................... B62D 35/001 |
| | | 296/193.03 |
| 2013/0087590 A1 * | 4/2013 | Lee ........................... B60R 5/04 |
| | | 224/496 |
| 2021/0300248 A1 * | 9/2021 | Whiteman .............. B60R 19/48 |

* cited by examiner

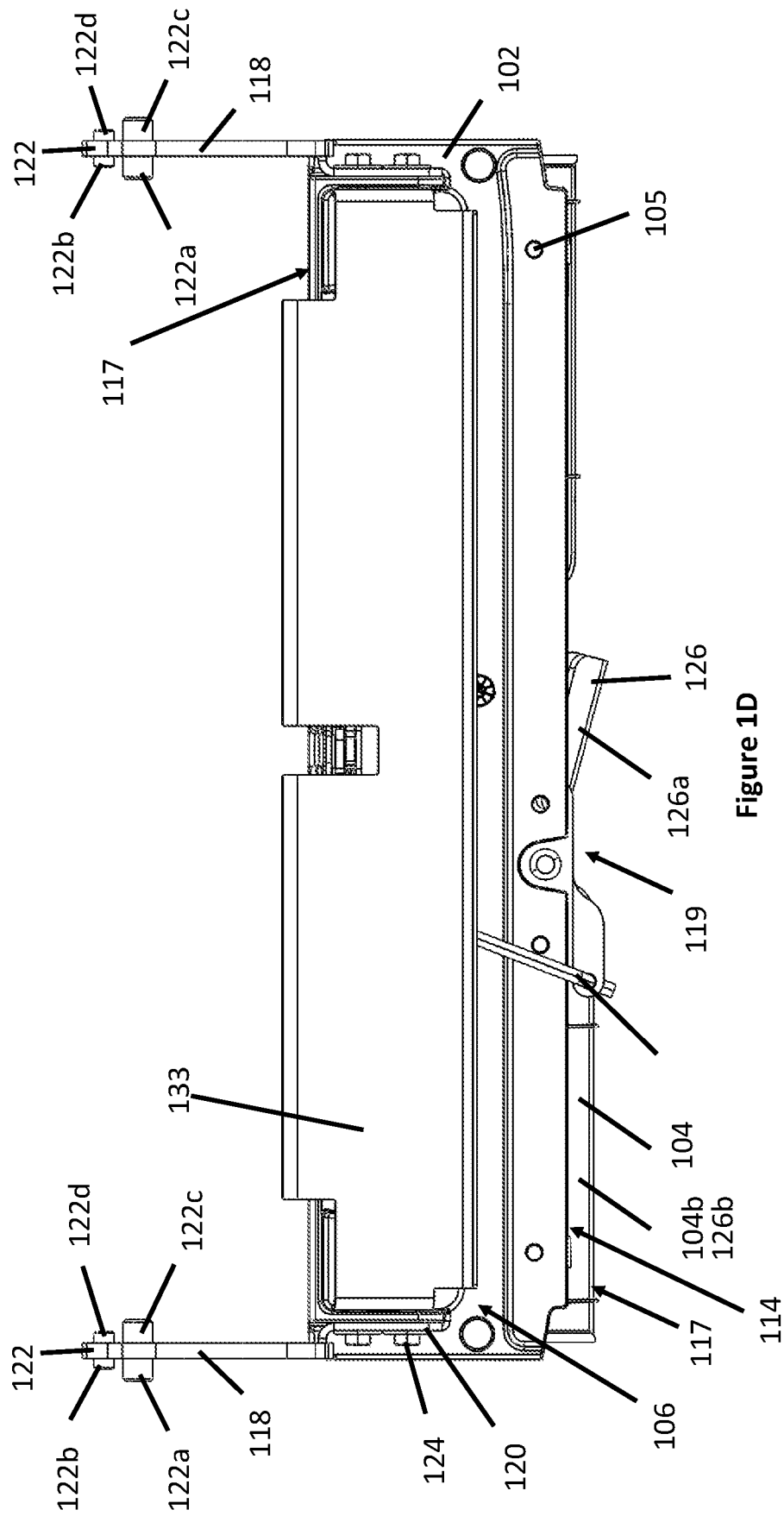

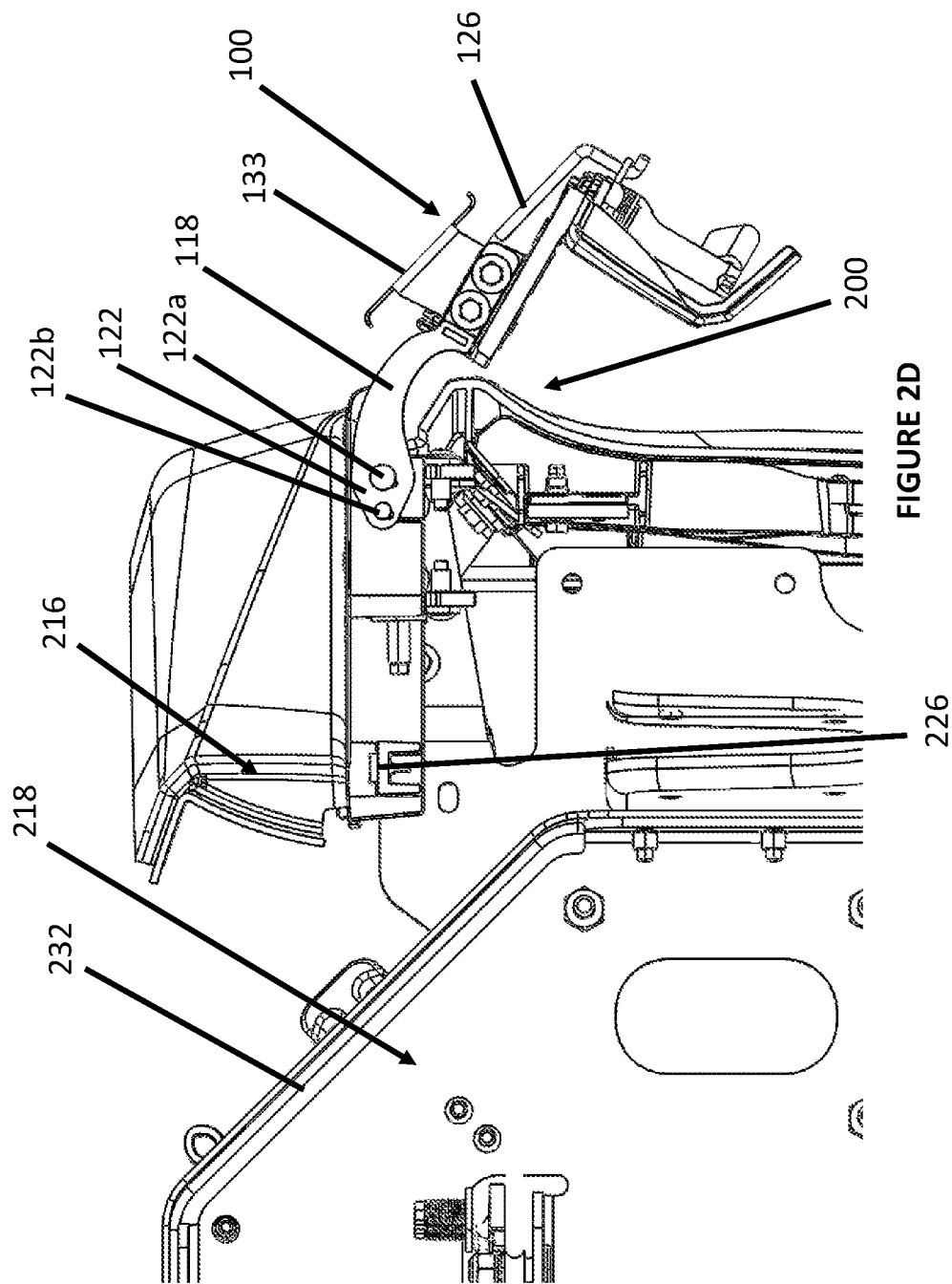

BATTERY ACCESS FLIP STEP

BACKGROUND

Technical Field

The present disclosure is directed to an access panel providing a user or mechanic access to an internal compartment within a vehicle.

Description of the Related Art

Generally, vehicles such as cars, trucks, semi-trucks, watercraft, and construction vehicles (e.g., bulldozers, dump trucks, flatbed trucks, road-rollers, front loaders, excavators, cranes, etc.) have conventional access panels or doors that allow a user or mechanic to access components within the vehicle. The conventional access panels provide the user or mechanic with access to components within the vehicle for tasks such as performing maintenance on the vehicle. For example, the access panels may provide access to an engine, electrical components (e.g., batteries, wiring, etc.), mechanical components (e.g., gears, axels, etc.), or some other components that the user or mechanic may need to access when conducting routine maintenance (e.g., replacement of components nearing an end of their useful life span), diagnostic tests (e.g., conducting diagnostic tests to determine if specific components need to be replaced or replaced soon), or emergency maintenance (e.g., replacing or fixing components within vehicle that have failed or broken).

While these access panels may provide ease of access and maintenance to components within a vehicle, it is desired to provide access panels at locations on a vehicle that are easily accessible while providing support structures such that a user or mechanic is in a comfortable and safe position when performing routine maintenance, diagnostic tests, or emergency maintenance on a vehicle as desired.

BRIEF SUMMARY

Embodiments of the present disclosure at least address providing an access panel at a location on a vehicle allowing a user or mechanic to maintain a comfortable and safe position when performing routine maintenance, diagnostic tests, or emergency maintenance on the vehicle. Embodiments in accordance with the present disclosure include access panels at or along a cab step of a vehicle that provide direct access to a compartment within the vehicle. For example, the compartment may be a battery box compartment containing and holding electrical wiring, a battery, a set of batteries, or some other type of power source or electronic component. Alternatively, the compartment may contain mechanical components such as gears, axels, or some other type of mechanical component.

Embodiments of the present disclosure of an access panel at a cab step include an access panel having a tread portion and a riser portion. In other words, in at least one embodiment of the present disclosure, the access panel has an L-shape. The access panel at the cab step has an opened position and a closed position. When the access panel is in the closed position, the tread portion of the access panel is substantially coplanar and flush with a corresponding tread portion of the cab step, and the riser portion of the access panel is substantially coplanar and flush with a corresponding riser portion of the cab step. Furthermore, when the access panel is in the opened position, the corresponding tread portion of the cab step, which is substantially coplanar or flush with the tread portion of the access panel when the access panel is in the closed position, remains in place and accessible, such that the user or mechanic may maintain balance, comfort and safety. When the access panel is in the opened position, the user or mechanic has access to the compartment that is covered by the access panel when in the closed position.

Some embodiments of the present disclosure of the access panel include a service step that is at the internal surface of the access panel. When the access panel is in the opened position, the service step is exposed and provides another point at which the user or mechanic may step on to maintain balance, comfort and safety when accessing a cab of a vehicle.

BRIEF DESCRIPTION OF THE SEVERAL VIEWS OF THE DRAWINGS

In the drawings, identical reference numbers identify similar elements or acts unless the context indicates otherwise. The sizes and relative proportions of the elements in the drawings are not necessarily drawn to scale.

FIG. 1D is a bottom-plan view of the embodiment of the access panel as shown in FIGS. 1A-1C;

FIG. 2D is a cross-sectional view of the embodiment of the access panel as shown in FIGS. 1A-1C at the cab step of the vehicle in the opened position as shown in FIG. 2C;

DETAILED DESCRIPTION

Figure 1A:
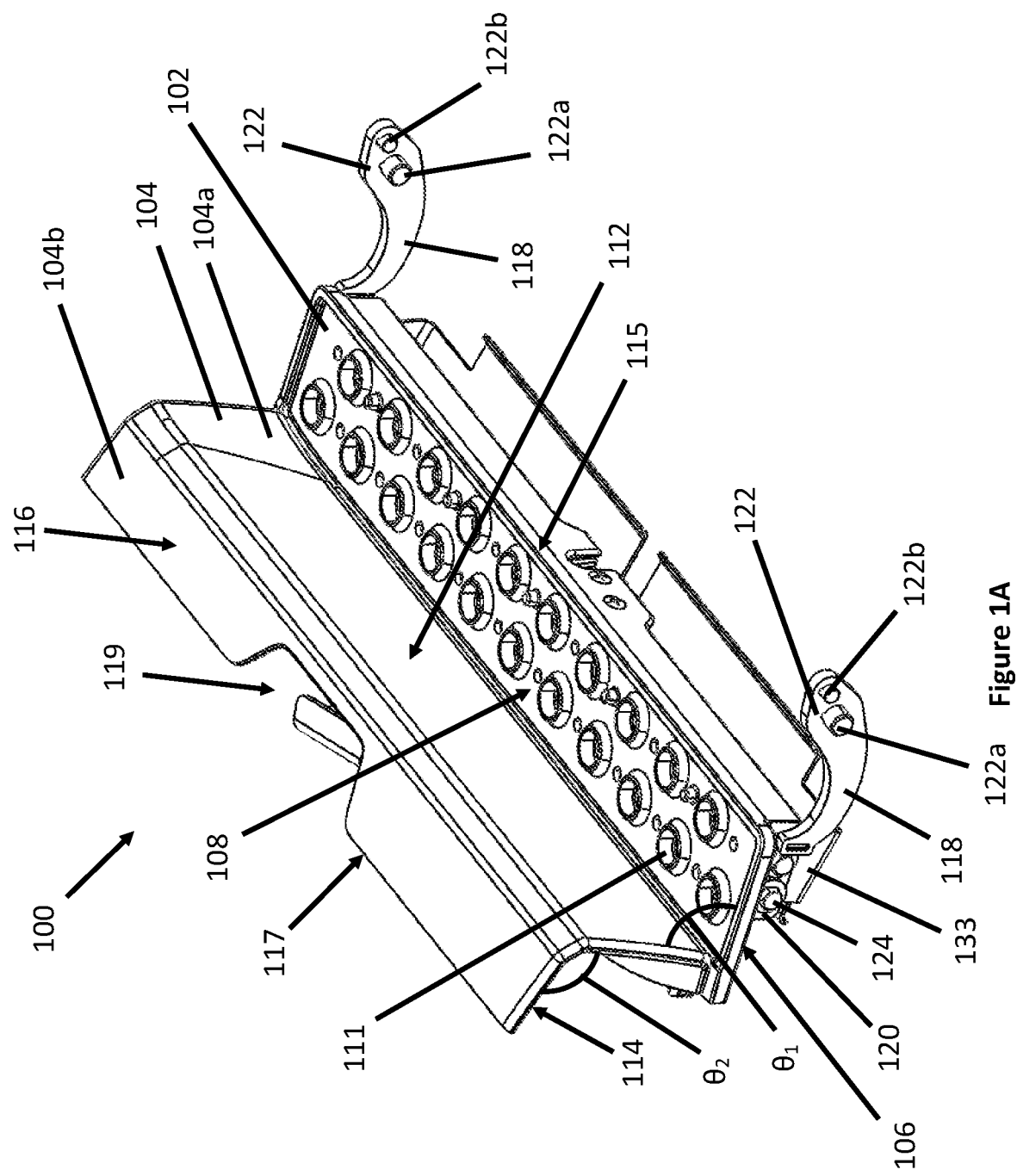
FIG. 1A is directed to a perspective view of an embodiment of an access panel.

In the following description, certain specific details are set forth in order to provide a thorough understanding of various embodiments of the disclosure. However, one skilled in the art will understand that the disclosure may be practiced without these specific details. In other instances, well-known structures and components associated with vehicles such as trucks, cars, construction vehicles, aircraft, watercraft, etc., have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second, third, fourth, etc., does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "top," "bottom," "vertical," "horizontal," "left," and "right," are used for only discussion purposes based on the orientation of the components in the discussion of the Figures in the present disclosure as follows. These terms are not limiting as to the possible positions explicitly disclosed, implicitly disclosed, or inherently disclosed in the present disclosure.

The term "substantially" is used to clarify that there may be slight differences or variations as for when a surface is coplanar with another surface in the real world, as nothing can be made perfectly equal or perfectly the same. In other words, substantially means that there may be some slight variation in actual practice, and instead, is made within accepted tolerances.

The terms "coplanar" and "flush" are used to define that adjacent surfaces smoothly transition from each other. For example, where a first end of a first surface meets a second end of second surface, the surfaces are substantially coplanar at the first end and the second end. In other words, there is a smooth transition between the first end of the first surface and the second end of the second surface. Further, in some embodiments, other locations further along the first surface and the second surface may not be "coplanar" and "flush" with each other in the traditional sense as well. Alternatively, in some embodiments, other locations further along the first surface and the second surface may be "coplanar" and "flush" with each other in the traditional sense as well.

As used in this specification and the appended claims, the singular forms "a," "an," and "the" include plural referents unless the content clearly dictates otherwise.

As discussed earlier, embodiments of the present disclosure of an access panel at a cab step include an access panel having a tread portion and a riser portion. In other words, at least one embodiment of the present disclosure of the access panel has an L-shape. The access panel at the cab step has an opened position and a closed position. When the access panel is in the closed position, the tread portion of the access panel is substantially coplanar and flush with a corresponding tread portion of the cab step, and the riser portion of the access panel is substantially coplanar and flush with a corresponding riser portion of the cab step. Furthermore, when the access panel is in the opened position, the corresponding tread portion of the cab step, which is substantially coplanar or flush with the tread portion of the access panel when the access panel is in the closed position, remains in the same position such that the user or mechanic may maintain balance, comfort and safety when accessing a cab of a vehicle. When the access panel is in the opened position, the user or mechanic has access to the compartment, which is covered by the access panel when in the closed position.

Some embodiments of the present disclosure of the access panel include a service step that is at an internal surface of the access panel. When the access panel is in the opened position, the service step is exposed and provides another point on which the user or mechanic may step to maintain balance, comfort and safety when accessing a cab of a vehicle. Similarly, when the access panel is in the opened position, the service step is exposed and provides another point on which the user or mechanic may step to enter a cab of a vehicle to which the access panel is attached.

Figure 1B:
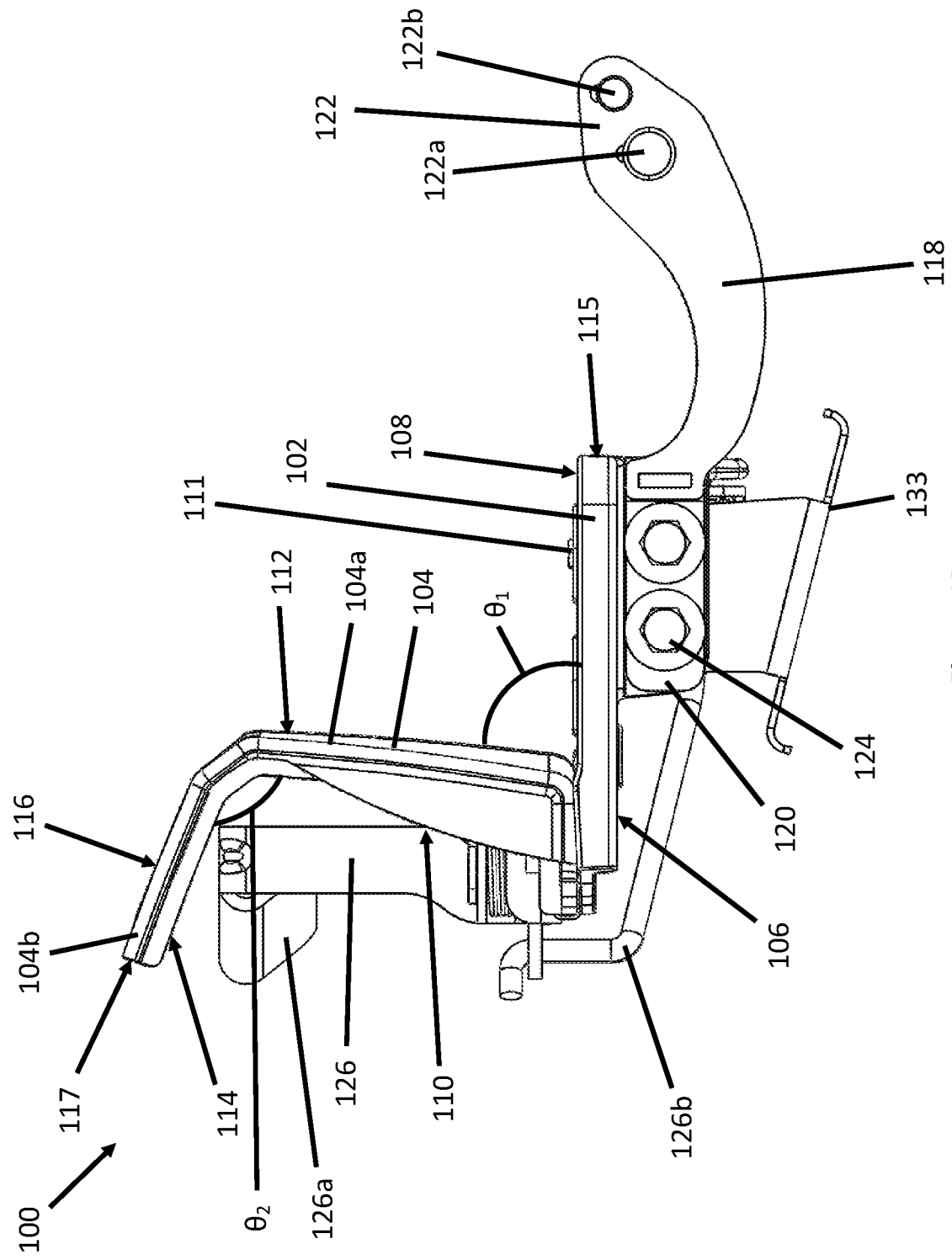
FIG. 1B is a side view of the embodiment of the access panel as shown in FIG. 1A.
Figure 1C:
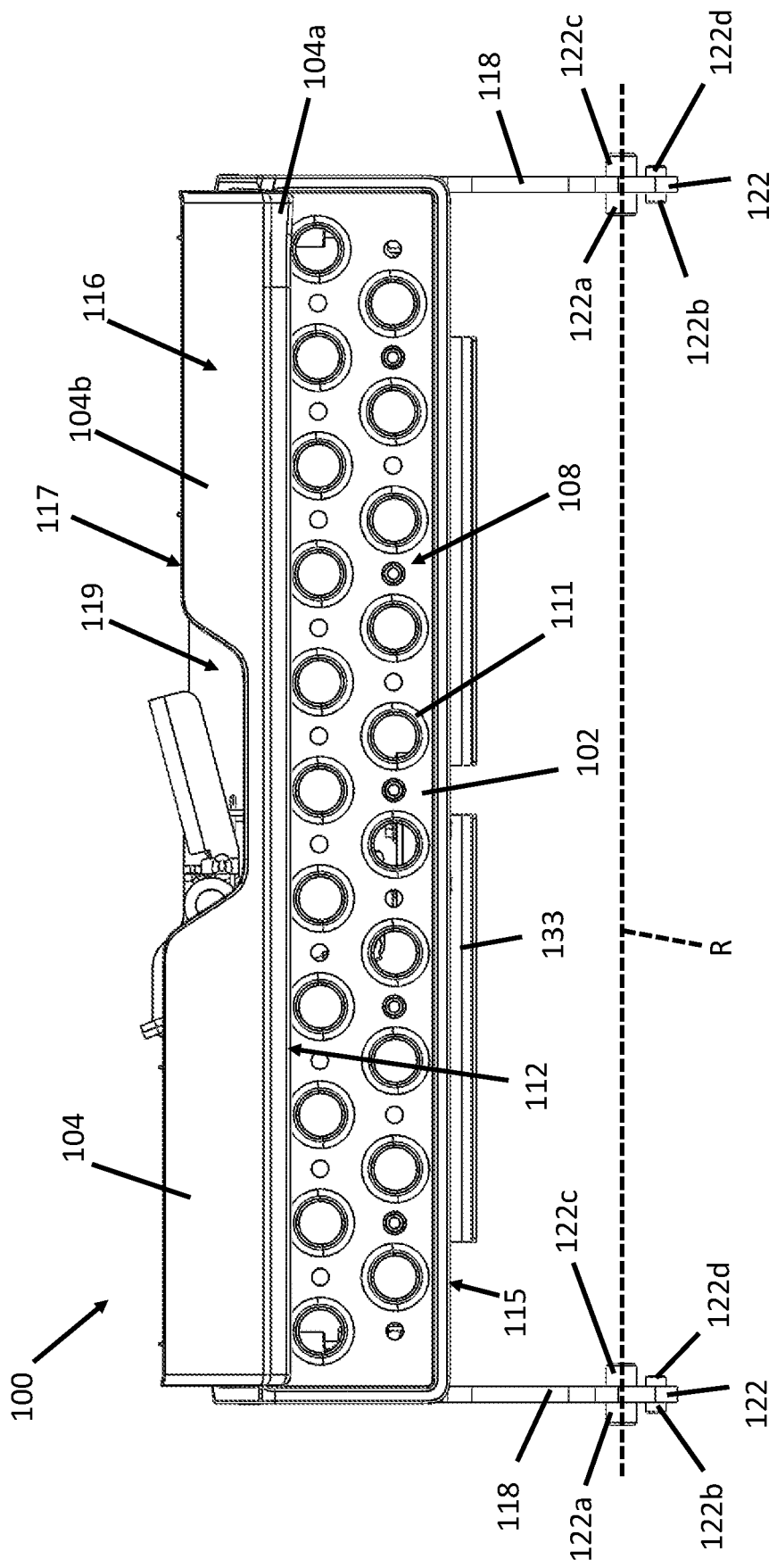
FIG. 1C is a top-plan view of the embodiment of the access panel as shown in FIGS. 1A and 1B.

FIG. 1A is directed to a perspective view of an embodiment of an access panel 100. FIG. 1B is a side view of the embodiment of the access panel 100 as shown in FIG. 1A. FIG. 1C is a top-plan view of the embodiment of the access panel 100 as shown in FIGS. 1A and 1B. FIG. 1D is a bottom-plan view of the embodiment of the access panel 100 as shown in FIGS. 1A-1C.

The access panel 100 includes a tread portion 102 extending in a first direction and a riser portion 104 extending in a second direction transverse to the first direction. In other words, based on the orientation of the access panel 100 as shown in FIG. 1A, the tread portion 102 is horizontal and the riser portion 104 is vertical such that the access panel 100 has a substantially L-shape. The substantially L-shape of the access panel 100 may be a stepped shape, a stepped structure shape, a stepped structure, a staircase shape, a step shape, or some other type of shape that is the same as or similar to the substantially L-shape of the access panel 100.

Figure 2A:
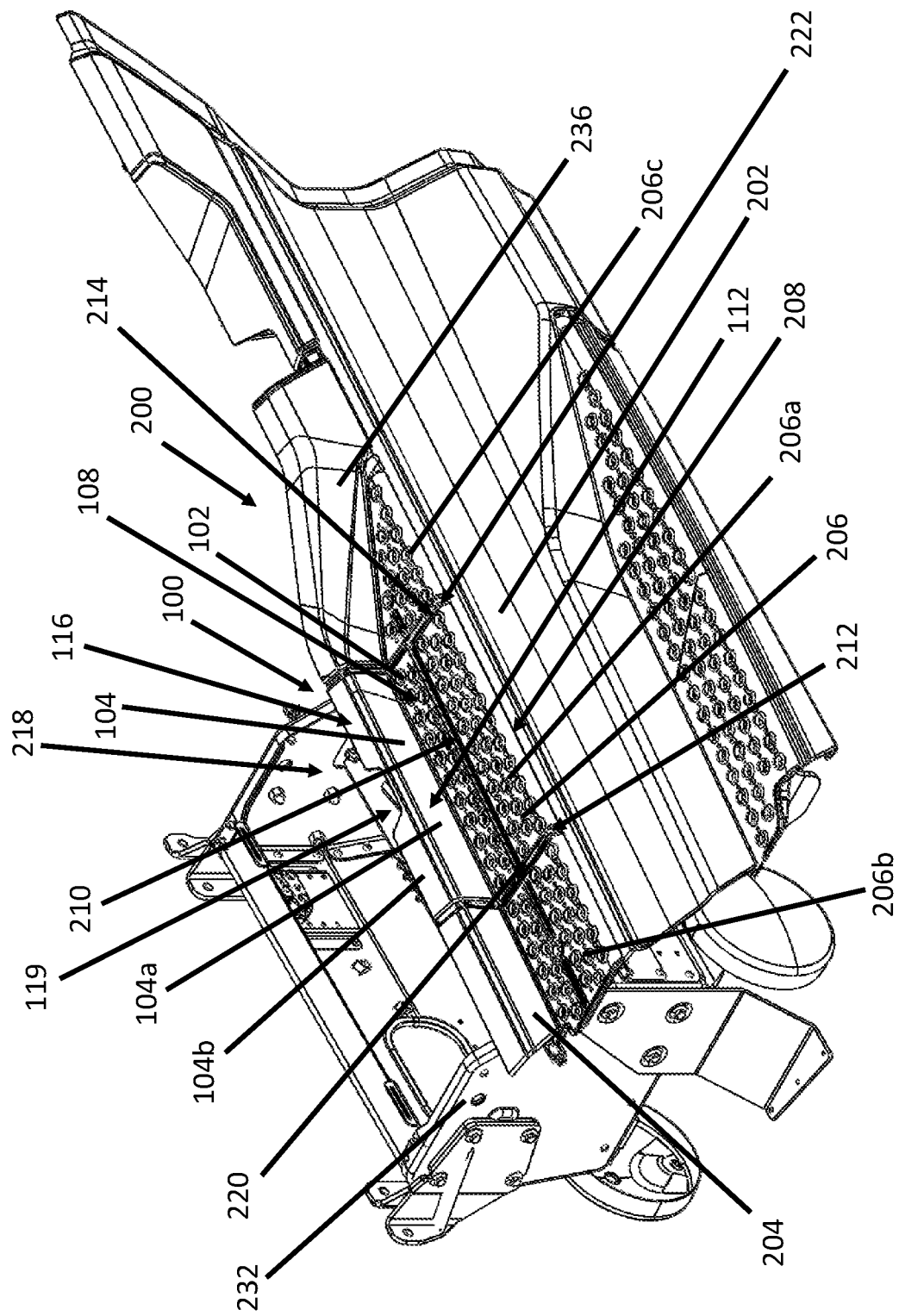
FIG. 2A is a perspective view of the embodiment of the access panel as shown in FIGS. 1A-1C at a cab step of a vehicle in a closed position.
Figure 2B:
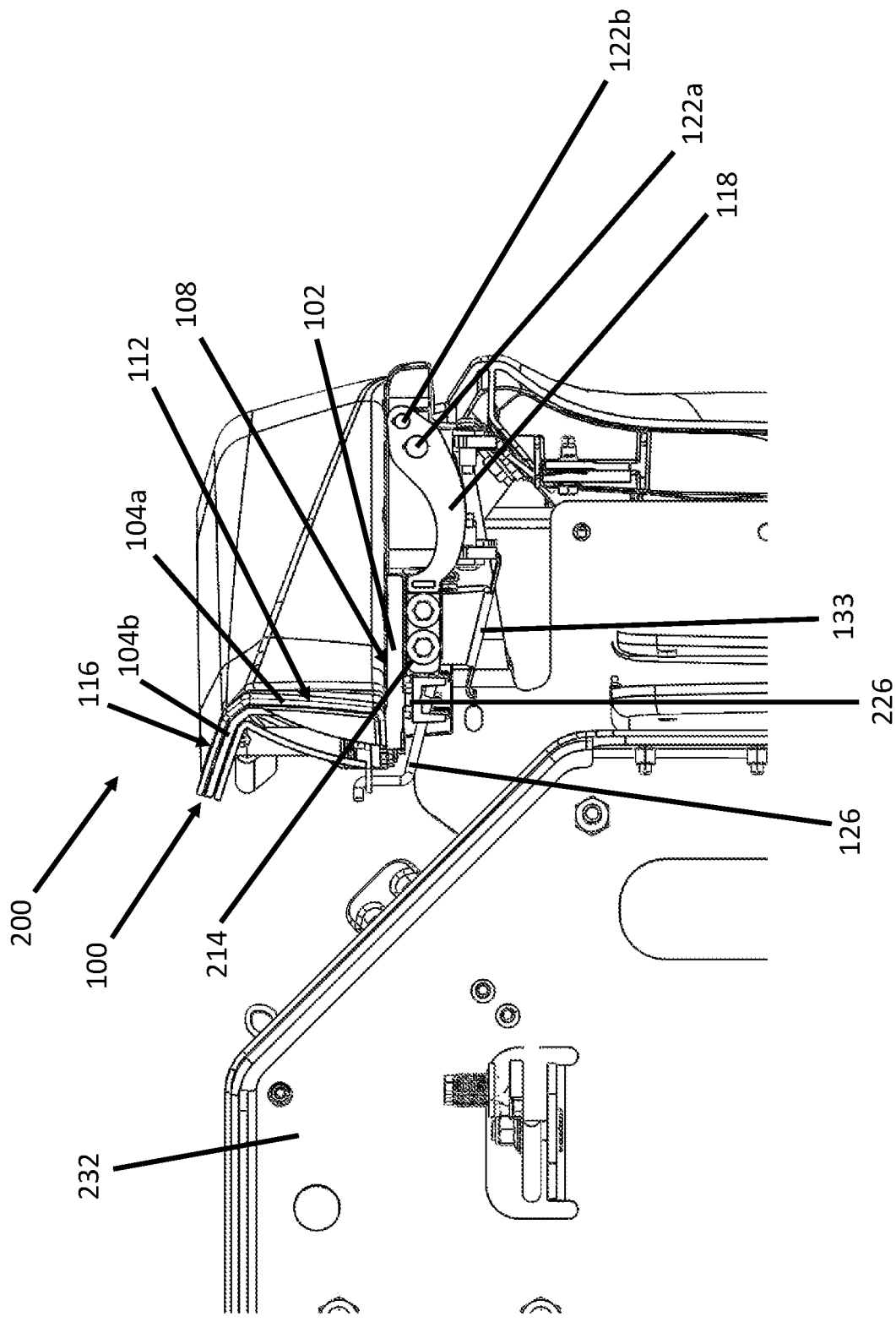
FIG. 2B is a cross-sectional view of the embodiment of the access panel as shown in FIGS. 1A-1C at the cab step of the vehicle in the closed position as shown in FIG. 2A.
Figure 2C:
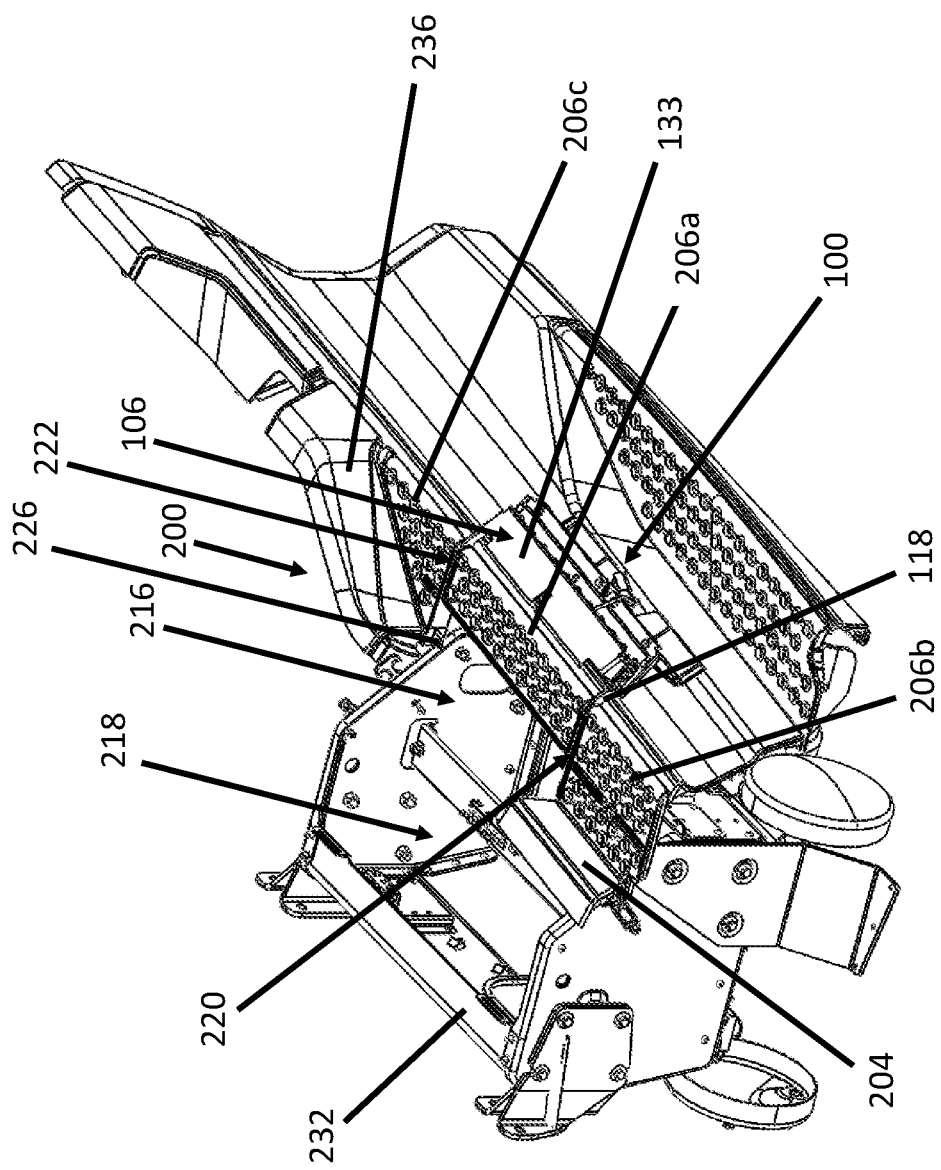
FIG. 2C is a perspective view of the embodiment of the access panel as shown in FIGS. 1A-1C at the cab step when the access panel is in the opened position.
Figure 2E:
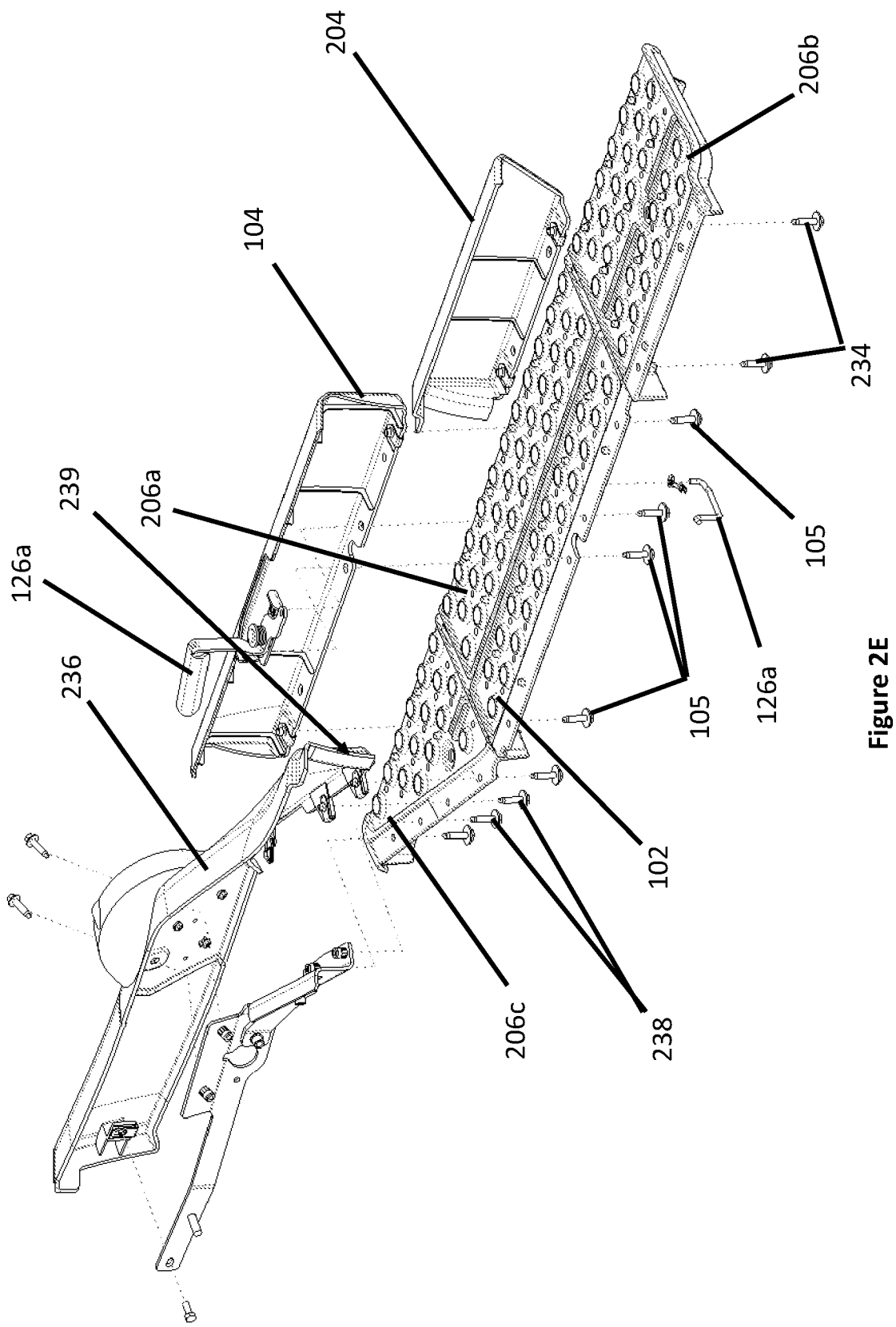
FIG. 2E is an exploded internal side view of the embodiment of the access panel in FIGS. 1A-1C at the cab step of the vehicle in the closed position as shown in FIGS. 2A and 2B.

The tread portion 102 is coupled to the riser portion 104 by a plurality of fasteners 105, which can more readily be seen in the exploded view in FIG. 2E. The plurality of fasteners 105 may be screws, nuts, bolts, snap fit fasteners, rivets, or some other type of fastener. In other words, in the illustrated embodiment, the tread portion 102 and the riser portion 104 are separate and distinct components that are coupled together by the plurality of fasteners 105 (e.g., screws, nuts, bolts, rivets, etc.) to form the access panel 100.

In some embodiments, the tread portion 102 and the riser portion 104 are made of a single, continuous sheet of material. For example, the sheet of material may be made of a metal material (e.g., aluminum, steel, titanium, etc.) that is bent at selected locations.

The tread portion 102 includes an internal surface 106 and an external surface 108 that is opposite to the internal surface 106. The tread portion 102 includes a first end 115 of the access panel 100, which has a surface that extends from the internal surface 106 to the external surface 108, and includes a tread 111 at and on the external surface 108. The tread 111 on the tread portion 102 includes two rows of tread 111. However, in some embodiments, the tread 111 may include one row, three rows, four rows, or some other number of rows of tread. The tread 111 provides traction to reduce the likelihood of a driver, user, operator, or mechanic from slipping or falling when stepping on the tread portion 102 to enter a cab of a vehicle to which the access panel is attached or coupled.

The riser portion 104 includes an internal surface 110 and an external surface 112 that is opposite to the internal surface 110. The riser portion 104 is transverse to the tread portion 102 of the access panel 100 by a first angle $\theta_1$, which may be a 45-degrees, 50-degrees, 60-degrees, 70-degrees, 80-degrees, 90-degrees (i.e., perpendicular), 100-degrees, or may be some other suitable angle. The riser portion 104 includes a first portion 104a and a second portion 104b that is transverse to the first portion 104a by a second angle $\theta_2$, which may be 45-degrees, 50-degrees, 60-degrees, 70-degrees, 80-degrees, 90-degrees (i.e., perpendicular), 100-degrees, or some other suitable angle. The second portion 104b includes an internal surface 114 and an external surface 116 that is opposite to the internal surface 114. The second portion 104b includes a second end 117 of the access panel 100. When the access panel 100 is attached to the vehicle, the second end 117 of the riser portion 104 will be directly adjacent to a cab of a vehicle when the access panel 100 is in a closed position.

In some embodiments, the riser portion 104 of the access panel 100 may not have the second portion 104b, and instead, both the riser portion 104 and the tread portion 102 may be substantially planar portions that are transverse to each other.

An opening 119 extends into and through the second portion 104b of the riser portion 104. The opening 119 provides a user or mechanic access to a latch assembly 126, which is at and on the internal surface 110 of the riser portion 104, such that the user or mechanic can lock or unlock the latch assembly 126 to open and close the access panel 100. The latch assembly 126 may have components present at various locations along the internal surfaces 106, 110, 114 of the access panel 100. For example, components of the latch assembly 126 may be at and on the internal surface 114 of the second portion 104b of the riser portion 104, may be at and on the internal surface 106 of the tread portion 102, may be at and on the access panel 100 at different locations, or may be at and on a combination of locations on the internal surfaces 106, 110, 114 of the access panel 100. The latch assembly 126 locks the access panel 100 in place when the access panel is in the closed position. For the sake of simplicity and brevity of the present disclosure, these functional details and interactions with respect to the latch component 126 will be discussed in further detail with respect to FIGS. 2A-2F.

The latch assembly 126 may be an automatic latching assembly that automatically locks when the access panel 100 is moved to the closed position. The latch assembly 126 may be a rotary latch, a pull latch, a two-stage latch, or some other latch or locking assembly configured to lock the access panel 100 in the closed position.

The internal surfaces 106, 110, 114 of the tread portion 102 and the riser portion 104, respectively, may be referred to together as an internal surface, an interior surface, an inner surface, an unexposed surface, or some other language referencing the internal surfaces 106, 110, 114 together that are facing an internal compartment of a vehicle when the access panel 100 is in the closed position, which can be seen in FIG. 2A.

The external surfaces 108, 112, 116 of the tread portion 102 and the riser portion 104, respectively, may be referred to together as an external surface, an exterior surface, an outer surface, an exposed surface, or some other language referencing the external surfaces 108, 112, 116 together that are exposed when the access panel 100 is in the closed position, which can be seen in FIG. 2A.

A pair of hinge components 118 are coupled to the internal surface 106 of the tread portion 102. The pair of hinge components 118 each include a first end 120 and a second end 122.

The first ends 120 are coupled to the internal surface 106 of the tread portion 102. For example, a pair of flanges may be present at and on the internal surface 106 of the tread portion 102 to which the first ends 120 are coupled to by fasteners 124 (e.g., screw, nut, bolt, rivet, pin, snap-fit fastener, etc.). Alternatively, in some embodiments, the first ends 120 may be permanently welded to the internal surface 106 of the tread portion 102. Alternatively, in some other embodiments, there may only be one hinge component 118 present or there may be more than two hinge components 118 present at and on the internal surface 106 of the tread portion 102.

Each of the hinge components 118 includes a first side and a second side that is opposite to the first side. The second ends 122 of the hinge components 118 each include a first protrusion member 122a and a second protrusion member 122b on first sides of the hinge components 118, and a third protrusion member 122c and a fourth protrusion member 122d on second sides of the hinge components 118. The first protrusion members 122a and the second protrusion members 122b extend outward from the first sides of the second ends 122 of the hinge components 118, respectively. The third protrusion members 122c and the fourth protrusion members 122d extend outward from the second sides of the second ends 122 of the hinge components 118, respectively.

Each of the first protrusion members 122a is aligned with a corresponding one of the third protrusion members 122c. For example, a first centerline of the first protrusion member 122a of the hinge component 118 on the left-hand side of FIG. 1C is aligned with a second centerline of the third protrusion member 122c of the hinge component 118 on the left-hand side of FIG. 1C. The same discussion applies to the first protrusion member 122a and the third protrusion member 122c for the hinge component on the right-hand side of FIG. 1C.

Each of the second protrusion members 122b is aligned with a corresponding one of the fourth protrusion members 122d. For example, a first centerline of the second protrusion member 122b of the hinge component on the left-hand side of FIG. 1C is aligned with a second centerline of the fourth protrusion member 122d of the hinge component 118 on the left-hand side of FIG. 1C. The same discussion applies to the second protrusion member 122b and the fourth protrusion member 122d of the hinge component 118 on the right-hand side of FIG. 1C.

Each of the centerlines of the first and third protrusion members 122a, 122c of both the hinge components 118 are aligned with each other such that an axis of rotation R is along the centerline of each of the first and third protrusion members 122a, 122c of both hinge components 118.

Each of the centerlines of the second and fourth protrusion members 122b, 122d of both the hinge components 118 are aligned with each other such that an axis passes along the centerline of each of the second and fourth protrusion members 122b, 122d of both hinge components 118.

The first and third protrusion members 122a, 122c are male portions or components that are inserted into corresponding female portions or components about which the hinge component 118 and the access panel 100 will rotate. The hinge components 118 are parts of gooseneck hinges. Alternatively, in some embodiments, the hinge components 118 may be part of a butt hinge, a friction hinge, a strap hinge, a spring-loaded hinge, a concealed hinge, a piano hinge, an offset hinge, an overlay hinge, lift-off hinges, a hidden barrel hinge, a scissor hinge, a gate hinge, or some other type of hinge component that allows the access panel 100 to have degrees-of-freedom such that the access panel 100 can be displaced or moved from an opened position to the closed position and vice versa. For the sake of simplicity and brevity of the present disclosure, these functional details and interactions with respect to the first and third protrusion members 122a, 122c of the hinge components 118 will become apparent in view of the further discussion in the present disclosure and from the further details in FIGS. 2A-2F.

The third and fourth protrusion members 122b, 122d are male portions or components that are inserted into corresponding female portions or components. The third and fourth protrusion members 122c, 122d work together with the corresponding female portions or components to stop the access panel 100 from over-rotating and contacting an external surface of a vehicle when opening the access panel 100, and from over-rotating and entering an internal compartment of the vehicle when closing the access panel 100. For the sake of simplicity and brevity of the present disclosure, these functional details and interactions with respect to the third and fourth protrusion members 122c, 122d of the hinge component 118 will become apparent in view of the further discussion in the present disclosure and from the further details in FIGS. 2A-2F.

A drip tray 133 is on the internal surface 106 of the access panel 100. The drip tray 133 is aligned with the tread 110 of the tread portion 102. The drip tray 133 is configured to redirect liquid away from mechanical or electrical components within a vehicle. For example, liquid (e.g., rain, oil, maintenance fluids, etc.) may pass through the tread 110 through the tread portion 102 onto the drip tray 133, which redirects the liquid away from internal components within the vehicle.

FIG. 2A is directed to the embodiment of the access panel 100 at a cab step 200 of a vehicle (which is not shown). The cab step 200 includes a first riser portion 202 and a second riser portion 204 that is separated from and spaced apart from the first riser portion 202. A tread portion 206 of the cab step 200 extends from the first riser portion 202 to the second riser portion 204. The tread portion 206 is transverse to the first riser portion 202 and the second riser portion 204.

The tread portion 206 includes a first tread part 206a separating a second tread part 206b from a third tread part 206c. The first, second, and third tread parts 206a, 206b, 206c may be referred to as tread portions, tread sub-portions, tread sub-parts, or some other language referring to pieces or parts of the tread portion 206. The first, second, and third tread parts 206a, 206b, 206c have a U-shape or a C-shape when viewed together. The first tread part 206a includes a first side 208, a second side 210 opposite to the first side 208, a third side 212 transverse to the first side 208 and the second side 210, and a fourth side 214 transverse to the first side 208 and the second side 210 as well as opposite to the third side 212. The first side 208 is positioned directly adjacent to the first riser portion 202, the third side 212 is directly adjacent to the second tread part 206b, and the fourth side 214 is directly adjacent to the third tread part 206c.

The second side 210 is positioned at a location between the first riser portion 202 and the second riser portion 204. In other words, the first tread part 206a extends from the first riser portion 202 and terminates before reaching the second riser portion 204. The first, second, third, and fourth sides 208, 210, 212, 214 may be ends, end surfaces, side surfaces, sidewalls, or some other type of end at which the first tread part 206a terminates. In some embodiments, the first, second, and third tread parts 206a, 206b, 206c may be made of a single, continuous material or may be individual, separate parts assembled together to form the tread portion 206 of the cab step 200.

The cab step 200 includes an opening 216 that is in direct communication with a compartment 218 within the vehicle, which can be more readily seen in FIG. 2C when the access panel 100 is in the opened position.

The opening 216 is directly adjacent to the second riser portion 204 and the second side 210 of the first tread part 206a. When the access panel 100 is in the closed position, the access panel 100 is positioned within the opening 216 and overlaps the compartment 218 such that the compartment 218 is not accessible, and instead, is protected from an external environment outside the vehicle by the access panel 100. In other words, when in the closed position, the access panel 100 covers or closes off the compartment 218. In the closed position, the end 115 of the access panel 100 is directly adjacent to the second side 210 of the first tread part 206a, and respective sides of the access panel 100 are directly adjacent to the second riser portion 204, the second tread part 206b, and the third tread part 206c. In the closed position, the external surface 108 of the tread portion 102 is substantially coplanar and flush with respective external surfaces of the tread portion 206 (e.g., external surfaces of the first, the second, and the third tread part 206a, 206b, 206c, respectively), the external surface 112 of the riser portion 104 is substantially coplanar and flush with respective external surfaces of the second riser portion 204, and the external surface 116 of the riser portion 104 is substantially coplanar and flush with respective external surfaces of the second riser portion 204. In other words, when the access panel 100 is in the closed position, the tread portion 102 and the tread portions 206a, 206b, 206c provide a continuous and unitary surface upon which a user or mechanic may step on to access the cab of the vehicle without slipping, tripping, or falling.

The cab step 200 further includes a first slot 220 that extends from the third side 212 of first tread part 206a to the second tread part 206b, and a second slot 222 that extends from the fourth side 214 of the first tread part 206a to the third tread part 206c. The first slot 220 and the second slot 222 are aligned with corresponding ones of the pair of hinge components 118. When the access panel 100 is displaced between the closed position to the opened position and vice versa, the hinge components 118 pass through either the first slot 220 or the second slot 222, respectively. Widths of the hinge components 118 are less than widths of the first slot 220 and the second slot 222 such that the hinge components 118 do not scrape, rub, or contact the tread parts 206a, 206b, 206c of the tread portion 206 when the access panel 100 is either opened to access the compartment 218 or closed to protect and cover the compartment 218.

FIG. 2B is a cross-sectional view taken along the hinge component 118 at the left-hand side of the access panel 100 and the first slot 220 as shown in FIG. 2A. Similar to FIG. 2A, in FIG. 2B the access panel 100 is in the closed position.

As shown in FIG. 2B, the hinge components 118 are recessed or inset within the cab step 200. One of the hinge components 118 is positioned between the third side 212 of first tread part 206a and the second tread part 206b, and the other of the hinge components 118 is positioned between the fourth side 214 of the first tread part 206a and the third tread part 206c. The hinged components 118 being recessed within the cab steps 200 through the first slot 220 and the second slot 222, respectively, protects the hinge components 118 from being damaged when the vehicle is in use. For example, the hinge components 118 recessed within the cab step reduce the likelihood of debris contacting and damaging the hinge components when the vehicle is in use at a construction site, on the road, or in some other environment in which the vehicle may be used.

When the access panel 100 is in the closed position, a stopper 226 contacts and abuts the internal surface 106 of the tread portion 102 of the access panel 100. The stopper 226 stops the access panel 100 from over-rotating into the compartment 218. The stopper 226 may be made of a rubber material, a plastic material, a deformable material, an elastic material, or some other material or combination of materials suitable for supporting the access panel 100 when in the closed position. FIG. 2C is a perspective view of the access panel 100 in the opened position. Similar to FIG. 2B, FIG. 2D is a cross-sectional view of FIG. 2C taken along one of the pair of hinge components 118 and the first slot 220. When the access panel 100 is in the opened position, the second ends 122 of the hinge components 118 are still recessed or inset within the cab step 200, and the first ends 120 of the hinge components 118 are outside the cab step 200.

The compartment 218 in FIGS. 2A-2D is a compartment of a battery box 232. The battery box 232 is configured to contain batteries (not shown) utilized for starting the vehicle and powering functions of the vehicle. Accordingly, the access panel 100 can be opened to access and replace batteries within the battery box 232. Alternatively, in some embodiments, the access panel may provide access to wiring, gears, or other electrical or mechanical components that undergo routine maintenance, emergency repairs, or diagnostic tests, which are completed by the user or mechanic. The access panel 100 may be a battery access panel, a battery compartment access panel, a compartment access panel, an electrical access panel, a mechanical access panel, a hinged access panel, an access door, or some other type of door or panel providing access to an internal compartment within a vehicle.

As shown in FIG. 2B, when the access panel 100 is in the closed position, the drip tray 133 is within the vehicle. As shown in FIG. 2D, when the access panel 100 is in the opened position, the drip tray 133 is outside of the vehicle.

FIG. 2E is directed to an exploded view of the access panel 100 at the cab step 200 in the closed position as shown in FIGS. 2A and 2B. As discussed earlier, the tread portion 102 of the access panel 100 is coupled to the riser portion 104 of the access panel 100 by the plurality of fasteners 105.

The second riser portion 204 is coupled to the tread portion 206, and more specifically, the second riser portion 204 is coupled to the second tread part 206b of the tread portion 206. A plurality of fasteners 234 (e.g., screws, nuts, bolts, rivets, snap fit, etc.) couple the second riser portion 204 to the second tread part 206b of the tread portion 206. In some embodiments, the second riser portion 204 may be welded to the second tread part 206b of the tread portion 206. In some embodiments, the second riser portion 204 and the second tread part 206b may be a single, continuous sheet of material similar to the earlier discussion with respect to the tread portion 102 and the riser portion 104 of the access panel 100.

The tread portion 206 is coupled to a fairing portion 236, and more specifically, the third tread part 206c is coupled to the fairing portion 236. A plurality of fasteners 238 (e.g., screws, nuts, bolts, rivets, snap fit, etc.) couple the third part 206c of the tread portion 206 to the fairing portion 236, which includes an end 239 that is substantially coplanar and flush with the external surface 112 of the riser portion 104 at least at a location where the fairing portion 236 is adjacent to the riser portion 104.

The latch component 126 includes a handle component 126a, which may be a handle, a lever, an articulation member, a handle member, or some other type of handle or member, which is coupled to a locking component 126b of the latch component 126. The handle component 126a is accessible through the opening 119 in the riser portion 104 of the access panel 100 such that the user or mechanic can access the handle component 126a. For example, as the handle component 126a is rotated or lifted by the user or mechanic the locking component 126b is unlocked and the access panel 100 may be opened by pulling on the handle component 126a or on the access panel 100 itself. In some embodiments, the handle component 126a may be replaced by a button component, a lever component, or some other type of articulation component for unlocking the locking component 126b. In other words, when the handle member 126a is in a first position (e.g., a locked position) the locking component 126b is in a second position (e.g., the locked position) and the access panel 100 is locked in place when in the closed position, and when the handle member is in a third position (e.g., unlocked position) the locking component 126b is in a fourth position (e.g., unlocked position) allowing for the access panel 100 to be opened.

Figure 2F:
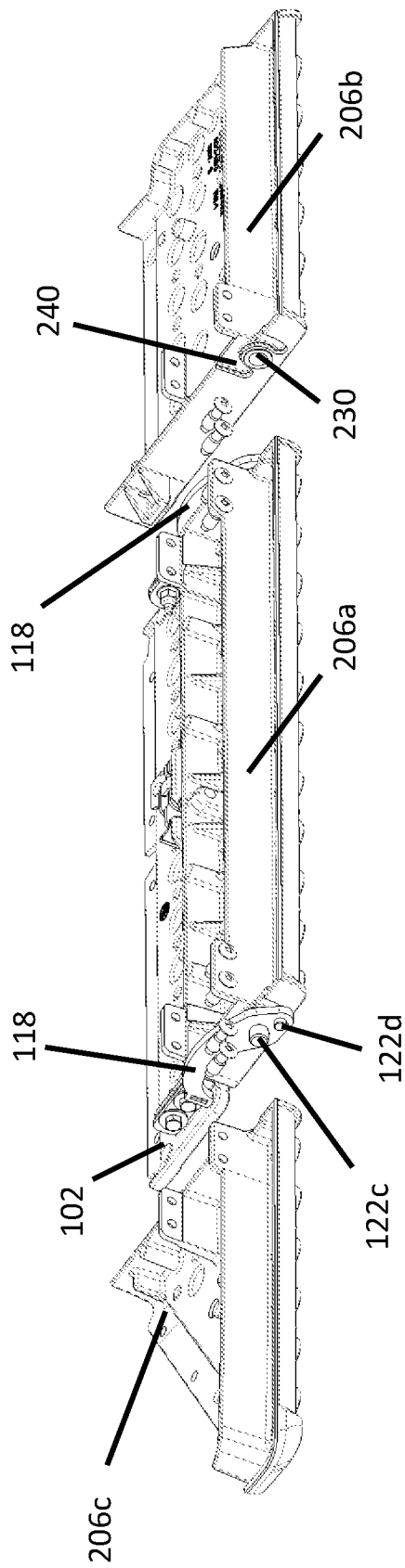
FIG. 2F is a partial-exploded bottom plan view of a tread portion of the embodiment of the access panel in FIGS. 1A-1C along with tread parts of the cab step as seen in FIGS. 2A-2D.

FIG. 2F is directed to a partial-exploded bottom plan view of the tread portion 102 of the access panel 100 and the tread portion 206, which includes the first tread part 206a, the second tread part 206b, and the third tread part 206c.

As shown in FIG. 2F, the protrusion members 122c, 122d of the hinge component 118 on the left-hand side of FIG. 2F extend outward from a respective side of the second end 122 of the hinge component 118 on the left-hand side of FIG. 2F towards the third tread part 206c. While not shown in FIG. 2F, the protrusion members 122a, 122b of the hinge component 118 on the right-hand side of FIG. 2F extend outward from a respective side of the second end 122 of the hinge component 118 on the right-hand side of FIG. 2F towards the second tread part 206b.

As shown in FIG. 2F, the second tread part 206b includes a female component 240. The female component 240 may be an opening or a slot that receives the first protrusion member 122a (not shown) of the hinge component 118 on the right-hand side of FIG. 2F. When the first protrusion member 122a is positioned within the female component 240, there is enough clearance such that the access panel 100 may rotate about the first protrusion member 122a and the female component 240.

Similarly, the third tread part 206c has a female component as well that is the same as or similar to the female component 240 of the second tread part 206b. However, the female component of the third tread part 206c is not visible in FIG. 2F. The female component of the third tread part 206c receives the third protrusion member 122c of the hinge component 118 on the left-hand side of FIG. 2F in the same or similar manner as the female component 240 receives the first protrusion member 122a of the other hinge component 118 on the right-hand side of FIG. 2F. The female component of the third tread part 206c and the third protrusion member 122c of the hinge component 118 on the left-hand side of FIG. 2F function in the same or similar manner as the female component 240 of the second tread part 206b and the first protrusion member 122a of the hinge component 118 on the right-hand side of FIG. 2F. Accordingly, the functional details of the female component of the third tread part 206c and the third protrusion member 122c of the hinge component 118 on the left-hand side of FIG. 2F will not be discussed in further detail herein.

As shown in FIG. 2F, the second tread part 206b includes a slot 230 having a first end and a second end directly adjacent to the female component 240. The second end of the slot 230 is separated from and spaced apart from the first end of the slot 230 by the female component 240. The slot 230 receives the second protrusion member 122b of the hinge component 118 on the right-hand side of FIG. 2F.

The slot 230 and the second protrusion member 122b stop the access panel 100 from over-rotating and entering the compartment 218 when the access panel 100 is being closed, and the slot 230 and the second protrusion member 122b stop the access panel 100 from over-rotating and contacting external surfaces of the vehicle when the access panel 100 is being opened reducing the likelihood of damaging external surfaces or internal components within the compartment 218. For example, the damage may be dents, scratches, or other types of deformations or damage to external surfaces of the cab step 200 or the vehicle as well as to internal components within the compartment 218. In other words, when the access panel 100 is in the opened position, the second protrusion member 122b contacts the first end of the slot 230 stopping the access panel 100 from further rotating (e.g., over rotating) and contacting external surfaces of the vehicle; and when the access panel 100 is in the closed position, the second protrusion member 122b contacts the second end of the slot stopping the access panel from further rotating and entering the compartment 218.

Similarly, the third tread part 206c has a slot that is the same as or similar to the slot 230 of the second tread part 206b. The slot of the third tread part 206c receives the fourth protrusion member 122d of the hinge component 118 on the left-hand side of FIG. 2F. The slot and the fourth protrusion member 122d function in the same or similar manner as the slot 230 and the second protrusion member 122b as discussed directly above. Accordingly, for the sake of simplicity and brevity of the present disclosure, the functional details of the slot of the third part 206c and the fourth protrusion member 122d will not be discussed in further detail herein.

While not shown in FIG. 2F, the first tread portion 206a may have corresponding female components on the left-hand side and the right-hand side of the first tread part 206a based on the orientation in FIG. 2F. The female component of the first tread portion 206a on the left-hand side of the first tread part 206a receives the first protrusion member 122a of the hinge component 118 on the left-hand side of FIG. 2F. The female component of the first tread portion 206a on the right-hand of the first tread part 206a receives the third protrusion member 122c of the hinge component 118 on the right-hand side of FIG. 2F.

While not shown in FIG. 2F, the first tread part 206a may have corresponding slots on the left-hand side and right-hand side of the first tread part 206a based on the orientation in FIG. 2F. The slot of the first tread part 206a on the left-hand side receives the second protrusion member 122b of the hinge component 118 on the left-hand side of FIG. 2F. The slot of the first tread part 206a receives the fourth protrusion member 122d of the hinge component 118 on the right-hand side of FIG. 2F.

The slots and the female components of the first tread part 206a along with the corresponding protrusion members of the hinge components 118 function in the same or similar manner as the discussions above with respect to the slot 230 and the female component 240 along with the corresponding protrusion members of the hinge components 118. Accordingly, for the sake of simplicity and brevity of the present disclosure, the functional details of the slots and female components of the first tread part 206a along with the corresponding protrusion members of the hinge components 118 will not be discussed in further detail herein.

The first and second protrusion members 122a, 122b of the hinge components 118 along with the corresponding female components of the first, second, and third tread parts 206a, 206b, 206c, respectively, define the axis of rotation R as shown in FIG. 1C upon which the hinge components 118 and the access panel 100 rotates. The third and fourth protrusion members 122c, 122d of the hinge components 118 along with the slots of the first, second, and third tread parts 206a, 206b, 206c, respectively, stop the access panel 100 from over rotating when opening or closing the access panel 100.

Figure 3A:
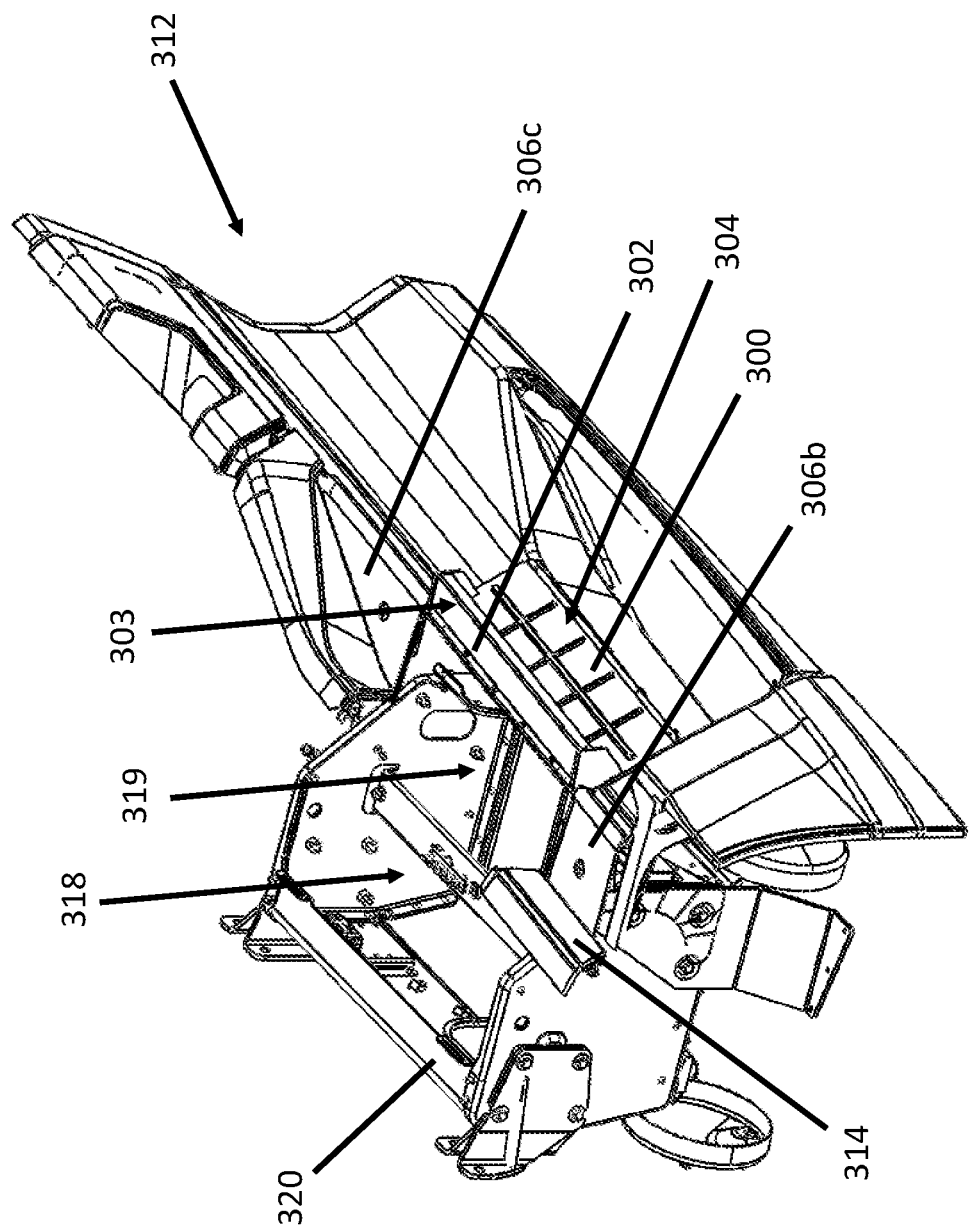
FIG. 3A is directed to an alternative embodiment of an access panel at a cab step of a vehicle in an opened position.
Figure 3B:
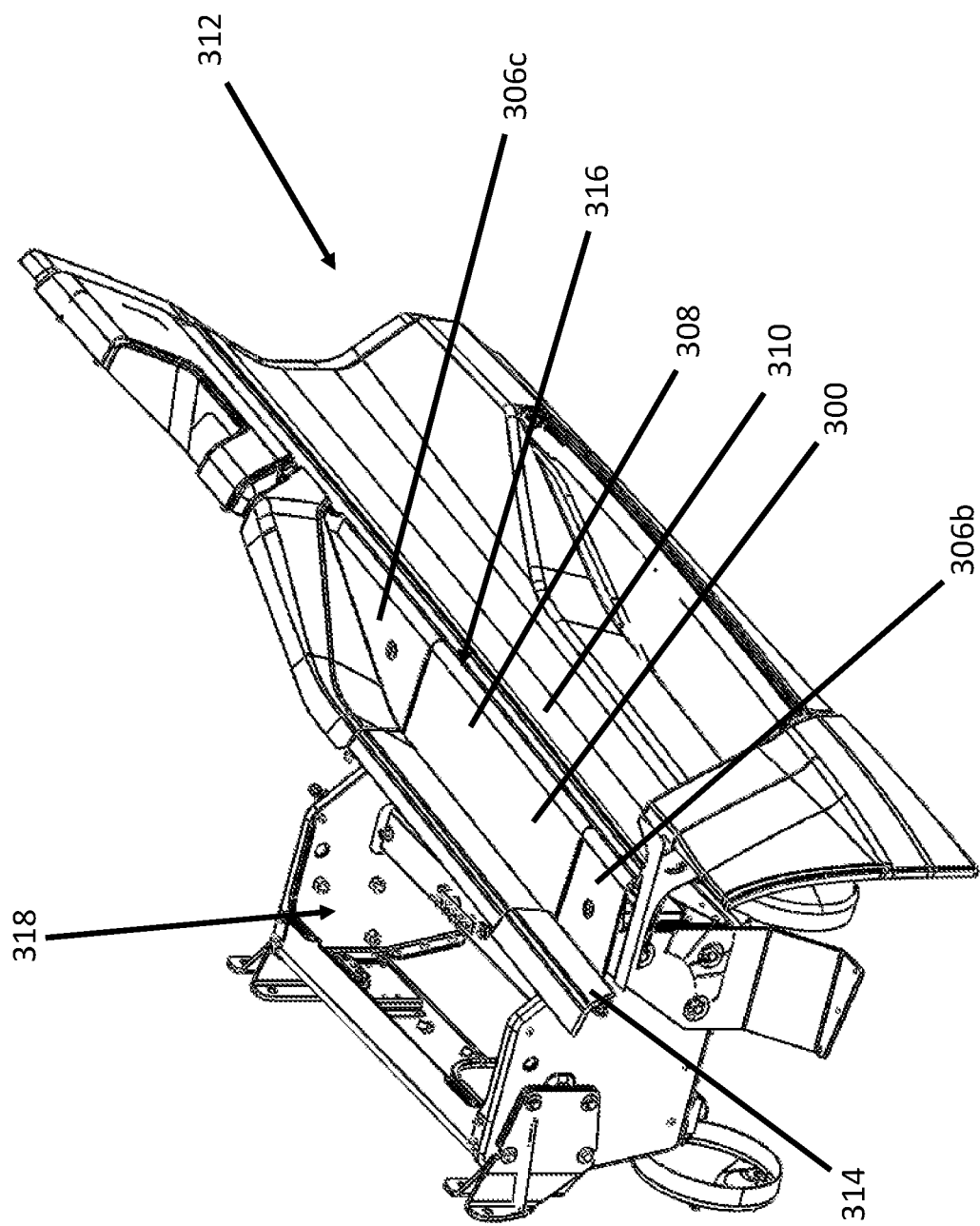
FIG. 3B is directed to the alternative embodiment of the access panel as shown in FIG. 3A at the cab step of the vehicle in a closed position.

FIGS. 3A and 3B are directed to perspective views of an alternative embodiment of an access panel 300 that is the same or similar to the access panel 100. FIG. 3A is directed to the access panel 300 being in a closed position, and FIG. 3B is directed to the access panel 300 being in an opened position. Accordingly, as the access panel 300 is the same as or similar to the access panel 100 as shown in FIGS. 1A-1C and 2A-2F, only differences or additional features of the access panel 300 will be discussed in further detail with respect to the access panel 100 as shown in FIGS. 1A-1C and 2A-2F.

Unlike the access panel 100, the access panel 300 has a service step 302 that is at and on an internal surface 304 of the access panel 300. When the access panel 300 is in the opened position, the service step 302 is exposed and may be utilized by the user or mechanic to obtain a comfortable and safe position when accessing an internal compartment of the vehicle through a cab step 312. When the service step 302 is exposed, a surface 303 of the service step 302 is substantially coplanar and flush with surfaces of a first tread part 306b and a second tread part 306c.

Unlike the cab step 200 including the access panel 100 as shown in FIGS. 2A-2F, the tread portion 206 is no longer present. Instead, a tread portion 308 of the access panel 300 extends between a first riser portion 310 of the cab step 312 to a second riser portion 314 of the cab step 312. An end 316 of the tread portion 308 of the access panel is directly aligned (e.g., substantially coplanar and flush) with the first riser portion 310, which is spaced further away from a compartment 318 within the vehicle than the second riser portion 314. The compartment 318 may be a compartment of a battery box 320. When the access panel 300 is in the closed position, the service step 302 is positioned internally within the cab step 312 of the vehicle.

Unlike the opening 216 of the cab step 200, an opening 319 has a portion that extends from the second riser portion 314 to the first riser portion 310, which can be seen in FIG. 3A when the access panel 300 is in the opened position. When the access panel 300 is in the closed position, the access panel 300 overlaps and covers the opening 319. The opening 319 is in direct communication with the compartment 318 through which the user or mechanic can go through by opening the access panel 300 to enter the compartment 318.

The compartment 318 is the same or similar to the compartment 218 as discussed earlier with respect to FIGS. 2A-2F. The first riser portion 310 is the same or similar to the first riser portion 202 as discussed with respect to FIGS. 2A-2F. The second riser portion 314 is the same or similar to the second riser portion 204 as discussed with respect to FIGS. 2A-2F. The cab step 312 is the same or similar to the cab step 200 as discussed with respect to FIGS. 2A-2F. The first tread part 306*b* and the second tread part 306*c*, respectively, are the same or similar to the second tread part 206*b* and the third tread part 206*c*, respectively, as discussed with respect to FIGS. 2A-2F. Accordingly, for the sake of simplicity and brevity of the present disclosure, the details of the compartment 318, the first riser portion 310, the second riser portion 314, the cab step 312, the first tread part 306*b*, and the second tread part 306*c* will not be discussed in further detail herein, and the earlier discussion of the same or similar features in FIGS. 2A-2F will not be reproduced herein.

Figure 3C:
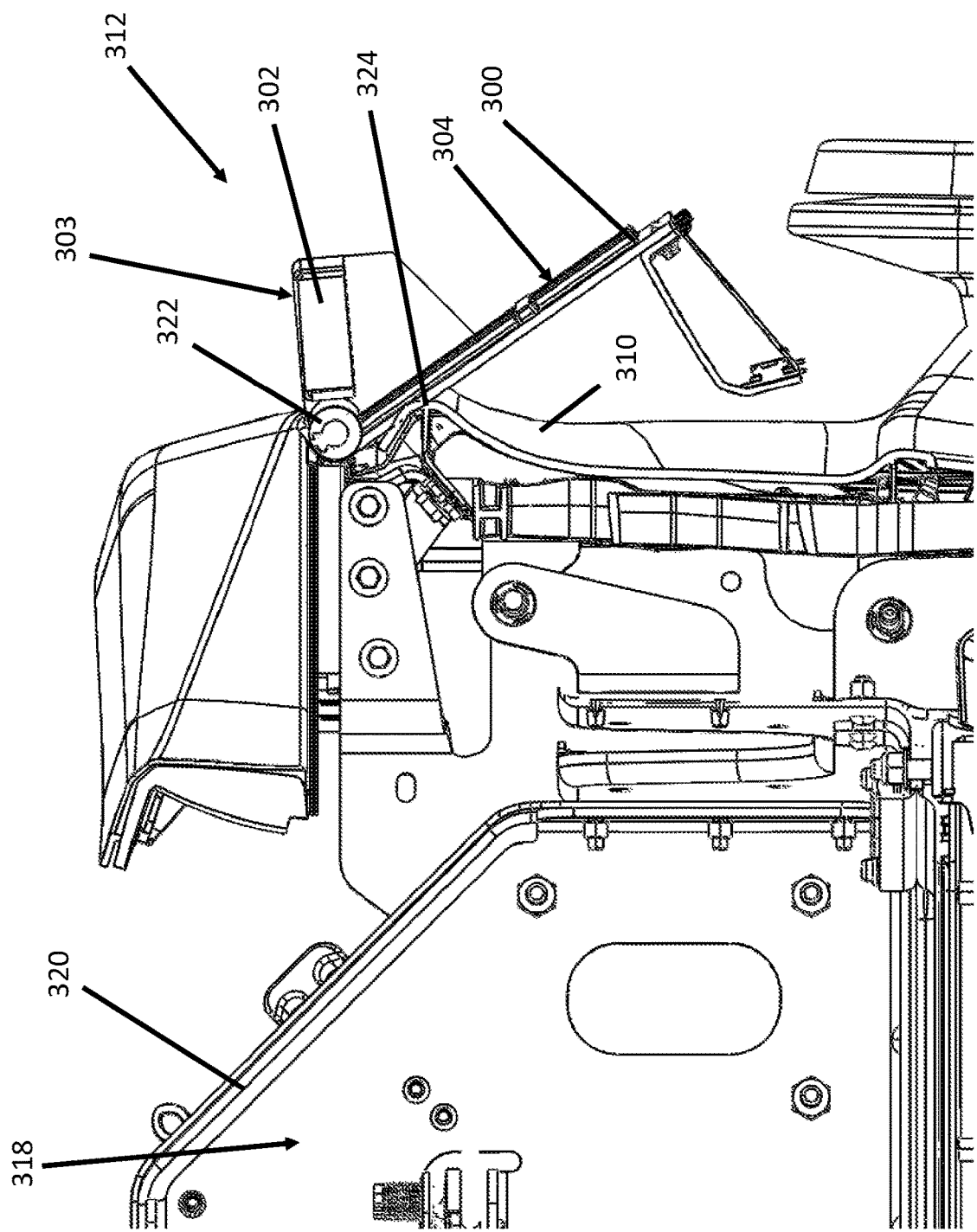
FIG. 3C is directed to the alternative embodiment of the access panel as shown in FIGS. 3A and 3B at the cab step of the vehicle in the opened position as shown in FIG. 3A.

FIG. 3C is directed to a cross-sectional view taken along an end of the access panel 300. The access panel 300 is attached to the vehicle by a hinge 322, which is positioned at the end of the access panel 300. In some embodiments, the hinge 322 may extend an entire length of the access panel 300. In some embodiments, there may be a first hinge 322 at the end of the access panel 300 and a second hinge at another end, which is opposite to the end at which the first hinge 322 is positioned. The hinge 322 may be a gooseneck hinge, a butt hinge, a friction hinge, a strap hinge, a spring-loaded hinge, a concealed hinge, a piano hinge, an offset hinge, an overlay hinge, lift-off hinges, a hidden barrel hinge, a scissor hinge, a gate hinge, or some other type of hinge component that allows the access panel 100 degrees-of-freedom to be displaced or moved from an opened position to the closed position and vice versa.

A protrusion portion 324 protrudes outward of the first riser portion 310 of the cab step 312. The protrusion portion 324 is integral the first riser portion 310. When the access panel 300 is in the opened position, the access panel 300 contacts the protrusion portion 324. The protrusion portion 324 may have a rubber material formed thereon configured to stop the access panel 300 in a position that is easily accessible and usable by the user or mechanic to safely and comfortably access the internal compartment 318 within the vehicle.

In some embodiments, the protrusion portion 324 may not be integral with the first riser portion, and instead, may be a stopper portion that is removably coupled to the first riser portion 310 such that as the protrusion portion 324 deteriorates through use, the protrusion portion 324 may be replaced by the user or mechanic.

Figure 4:
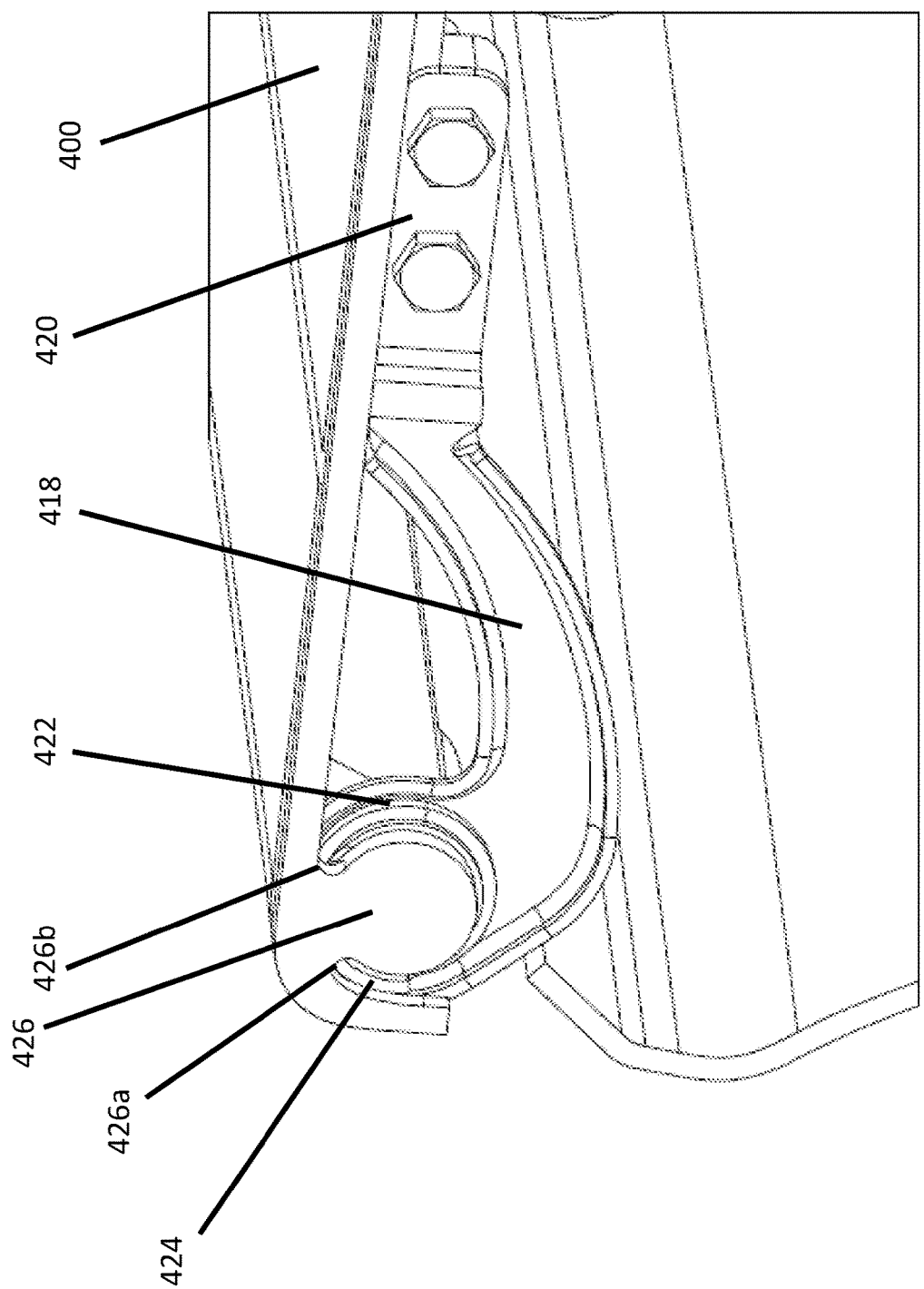
FIG. 4 is directed to an alternative embodiment of a hinge component coupled to an alternative embodiment of an access panel of the present disclosure.

FIG. 4 is directed to an alternative embodiment of hinge components 418 at an internal surface of an embodiment of an access panel 400. The hinge components 418 are the same or similar to the hinge components 118 as discussed with respect to FIGS. 1A-1C and 2A-2F. The access panel 400 is the same or similar to the access panel 100 as discussed with respect to FIGS. 1A-1C and 2A-2F. Accordingly, only differences or additional features of the hinge components 418 and the access panel 400 with respect to the hinge components 118 and the access panel 100 as shown in FIGS. 1A-1C and 2A-2F will be discussed in further detail as follows.

The first ends 420 are coupled to internal surface 106 of the tread portion 102 in the same or similar manner as the hinge components 118 as discussed with respect to FIGS. 1A-1C. However, unlike the hinge components 118, each of the hinge components 418 have a second end 422 with a stopper portion 424, which is integral with the second end 422. The stopper portion 424 is a tab that protrudes outward from a side of the second end 422. When the access panel 400 is being closed (e.g., displacing the access panel from the opened position to the closed position), the stopper portion 424 contacts a first end 426*a* of a rod component 426 stopping and preventing the access panel 400 from over-rotating when closing the access panel 400. When the access panel 400 is being opened (e.g., displacing the access panel from the closed position to the opened position), the stopper portion 424 contacts a second end 426*b* of the rod component 426 stopping and preventing the access panel 400 from over-rotating when opening the access panel 400. The rod component passes through the second end of a corresponding one of the hinge components 418.

In some other embodiments, a hinge component may have a substantially U-shape or C-shape at a second end, which may be referred to as a pronged structure. The pronged structure may include a first prong and a second prong spaced apart from the first prong. The prongs at the second end are coupled to a corresponding pin or rod components, which are the same or similar to the rod component 426, as discussed earlier within the present disclosure, of a vehicle about which the pronged hinge components will rotate. The U-shape or C-shape of the hinge component may snap-fit onto the rod component.

As discussed above, some embodiments of the access panels within the present disclosure may have hinge components that are recessed within or inset within the cab step of the vehicle to protect the hinge components of the access panel when in the closed position. Recessing the hinge components within the cab step when the access panel is in the closed position reduces the likelihood of damaging the hinge components when the vehicle is in use. For example, the likelihood of debris hitting the hinge components at high speed, which may dent or bend the hinge components, is significantly reduced as the debris would more readily come into contact with an external surface of the vehicle and not contact the hinge components. This reduction in the likelihood of damaging the hinge components increases the useful lifespan of the hinge components as compared to a structure in which the hinge components were not recessed or inset within the cab step.

As discussed above, some embodiments of the access panels within the present disclosure have surfaces that are coplanar, flush and relatively seamless and unitary with other surfaces of a cab step when the access panels are in the closed position. This reduces the likelihood of a user, operator, driver, or mechanic slipping, tripping, or falling as compared to an access panel that slightly protrudes outward from the cab step, which may instead create a raised lip upon which the user, operator, driver, or mechanic may trip. This reduction in the likelihood of falling or tripping reduces the likelihood of a user or mechanic being injured on the job when using the vehicle or conducting maintenance on the vehicle.

As discussed above, some embodiments of the access panels within the present disclosure provide a foothold even when the access panels are in the opened position. The provided foothold allows a user or mechanic to easily and readily access the internal compartment within the vehicle in a safe manner by reducing the likelihood of slipping, tripping, or falling when replacing parts within the internal compartment, conducting maintenance, or conducting diagnostic tests. Accordingly, this reduction in the likelihood of falling reduces the likelihood of a user or mechanic being injured when accessing the internal compartment of the vehicle through the embodiments of the access panels within the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
a compartment;
a cab step including:
a first riser portion;
a second riser portion being spaced apart from the first riser portion;
a first tread portion having a first side positioned adjacent to the first riser portion and a second side positioned between the first riser portion and the second riser portion, the second side being opposite the first side;
an opening being directly adjacent to the first tread portion and the second riser portion, the opening overlapping the compartment;
a third tread portion adjacent to a third side of the first tread portion, the third side being transverse the first side and the second side;
a fourth tread portion adjacent to a fourth side of the first tread portion, the fourth side being transverse to the first side and the second side, the fourth side being opposite to the third side;
a first slot between the first tread portion and the third tread portion; and
a second slot between the first tread portion and the fourth tread portion; and
an access panel being hingedly coupled to the cab step and rotatable in an outward direction away from an interior of the vehicle from a closed position to an opened position, the access panel including:
a second tread portion being directly adjacent to the first tread portion when the access panel is in the closed position; and
a third riser portion being directly adjacent to the second riser portion when the access panel is in the closed position.

2. The vehicle of claim 1, wherein the access panel covers the opening when in the closed position and exposes the opening when in the open position.

3. The vehicle of claim 1, wherein the first tread portion is transverse to both the first riser portion and the second riser portion.

4. The vehicle of claim 3, wherein the second tread portion and the third riser portion of the access panel include external surfaces, and, when the access panel is in the closed position, the external surface of the second tread portion is substantially coplanar with an outer surface of the first tread portion and the external surface of the third riser portion is substantially coplanar with an outer surface of the second riser portion.

5. The vehicle of claim 1, wherein the access panel further comprises:
an internal surface facing the compartment when the access panel is in the closed position; and
a locking component at the internal surface of the access panel being configured to lock the access panel in the closed position.

6. The vehicle of claim 5, wherein the locking component is a latch lock.

7. The vehicle of claim 1, wherein the second tread portion of the access panel is transverse to the third riser portion of the access panel.

8. The vehicle of claim 1, wherein the access panel further comprises:
a first hinge component including:
a first end fixedly coupled to the second tread portion of the access panel; and
a second end hingedly coupled to the cab step, the first end being adjacent the third side;
a second hinge component including:
a third end fixedly coupled to the second tread portion of the access panel; and
a fourth end hingedly coupled to the cab step, the fourth end being adjacent to the fourth side.

9. The vehicle of claim 8, wherein the first hinge component passes through the first slot and the second hinge component passes through the second slot when the access panel is displaced between the opened position and the closed position.

10. The vehicle of claim 8, wherein the first hinge component and the second hinge component are gooseneck hinges.

11. The vehicle of claim 8, wherein the access panel is hingedly coupled to the first tread portion.

12. The vehicle of claim 1, further comprising:
a first stopper being directly adjacent to the third tread portion and being within the opening;
a second stopper being directly adjacent to the fourth tread portion and being within the opening;
wherein the first stopper and the second stopper physically contact an internal surface of the access panel when the access panel is in the closed position.

13. A vehicle, comprising:
a compartment;
a cab step including an opening extending through the cab step to the compartment;
an access panel hingedly coupled to the cab step, the access panel having an opened position and a closed position, the access panel including:
an internal surface facing the compartment when the access panel is in the closed position; and
a service step at the internal surface, the internal surface and the service step being exposed when the access panel is in the opened position.

14. The vehicle of claim 13, wherein the cab step further comprises:
a first riser portion;
a second riser portion spaced apart from the first riser portion;
a first tread portion extending between the first riser portion and the second riser portion.

15. The vehicle of claim 14, wherein the opening extends through the first tread portion and the second riser portion.

16. The vehicle of claim 15, wherein the access panel includes a third riser portion and a second tread portion, and, when the access panel is in the closed position, the third riser portion is substantially coplanar with the second riser portion and the second tread portion is substantially coplanar with the first tread portion.

17. A vehicle, comprising:
a cab step including:
a first riser portion;

a second riser portion being spaced apart from the first riser portion, the second riser portion having a first external surface;

a first tread portion having an end terminating at a location between the first riser portion and the second riser portion, the first tread portion having a second external surface transverse to the first external surface, wherein the first tread portion includes a first slot extending through the first tread portion and a second slot extending through the first tread portion, the second slot being spaced apart from the first slot; and an opening extending through the first tread portion and the second riser portion; and an L-shaped panel hingedly coupled to the cab step and rotatable in an outward direction away from an interior of the vehicle from a closed position to an opened position, the L-shaped panel including:

a third external surface substantially coplanar with the first external surface when the L-shaped panel is in the closed position;

a fourth external surface substantially coplanar with the second external surface when the L-shaped panel is in the closed position;

an inner surface;

a first hinged component having a first end fixedly coupled to the inner surface and a second end hingedly coupled to the first tread portion, the first hinged component being configured to pass through the first slot when moving the L-shaped panel between the closed position and the opened position; and a second hinged component having a third end fixedly coupled to the inner surface and a fourth end hingedly coupled to the first tread portion, the second hinged component being configured to pass through the second slot when moving the hinged component between the closed position and the opened position wherein the L-shaped panel includes an end terminating at a location between the first riser portion and the second riser portion, the end of the L-shaped panel being directly adjacent to the end of the first tread portion when the L-shaped panel is in the closed position.

\* \* \* \* \*